Aug. 3, 1926.  
D. B. JACOBS  
ELASTIC UNIT  
Filed August 11, 1925
1,594,962
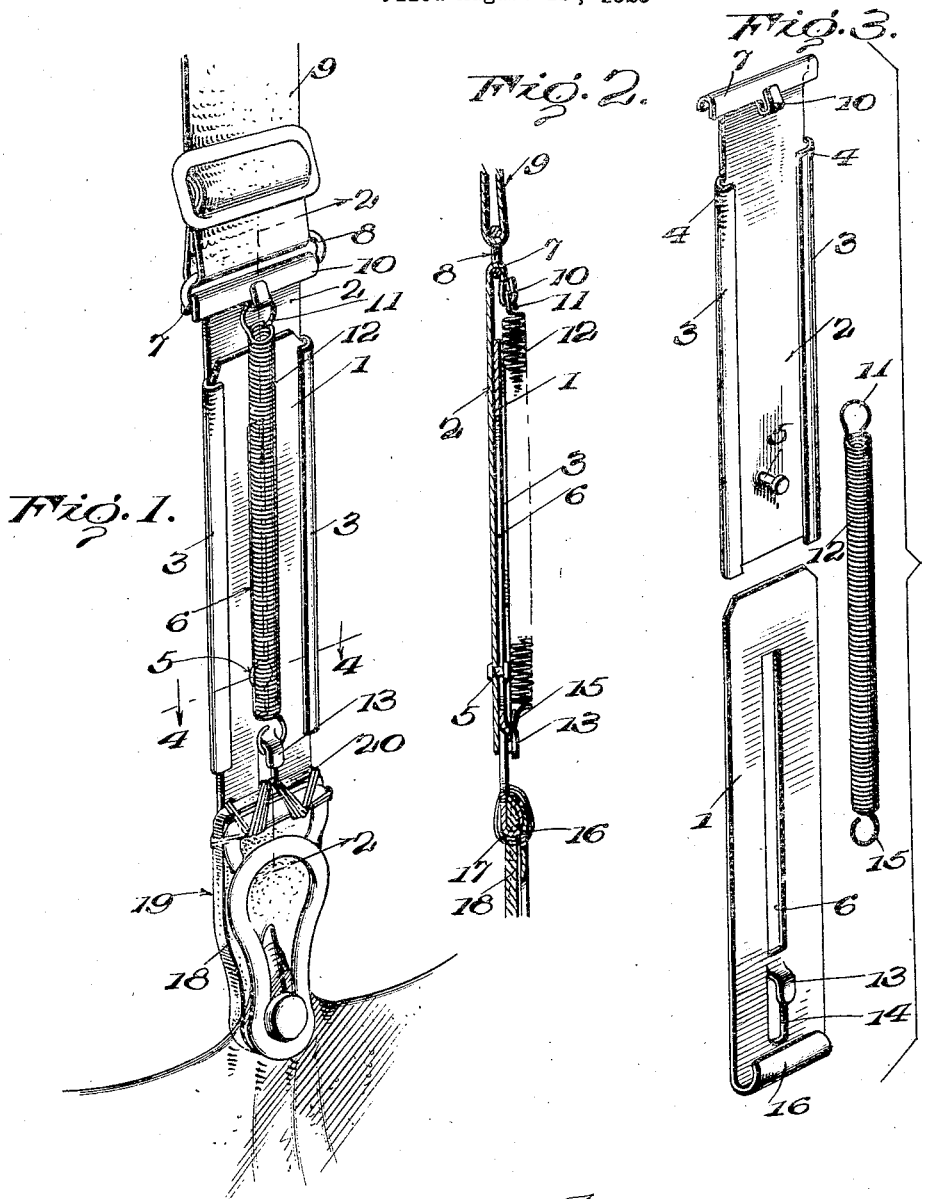
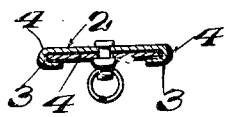
WITNESSES
INVENTOR
D. B. Jacobs.
BY
ATTORNEYS Patented Aug. 3, 1926.

1,594,962

UNITED STATES PATENT OFFICE.

DANIEL BRADFORD JACOBS, OF SWAN VALLEY, IDAHO.

ELASTIC UNIT.

Application filed August 11, 1925. Serial No. 49,596.

My invention is an elastic unit of the type comprising a pair of slidably contacting inelastic members yieldingly connected by a retractile spring, and it consists in the combinations, constructions and arrangements herein described and claimed.

An object of the invention is the provision of an elastic unit of the character described having novel means for connecting the opposite ends of the respective slidably contacting members of the unit with the opposite ends of a retractile connecting spring for yieldingly holding the elastic unit in contracted position.

A further object of the invention is the provision of a yielding unit of the character described having the opposite end portions of the relatively movable slidably contacting members of the device formed in a novel manner to produce attaching elements for engaging with suitable known fastening devices for connecting the opposite ends of the device with adjacent ends of lengths of tape, ribbon or other inelastic members, the end portion of one of the members of the device also being formed to provide an attaching element for connecting one end of a retractile spring to said one member of the device.

A still further object of the invention is the provision of an elastic unit of the character described which comprises but relatively few parts, is adapted to be manufactured at a slight cost, and is thoroughly practical commercially.

Other objects and advantages of the invention will be apparent from the following description, considered in conjunction with the accompanying drawings, in which:—

Figure 1 is a perspective view of the improved elastic unit in position to connect a hose supporter fastener with an elongated inelastic member, the elastic unit being shown in contracted position, Figure 2 is a section along the line 2—2 of Figure 1, Figure 3 is a perspective group view of the members of the elastic unit separated from one another, and Figure 4 is a section along the line 4—4 of Figure 1.

In carrying out the invention, I make use of two strips 1 and 2, respectively, of light gauge metal or other suitable inelastic and relatively strong material. One of the strips, as the strip 2, is of greater width for the greater part of its length from one end thereof than the other strip. The longitudinal edge portions of this relatively wide portion of the strip 2 are bent to produce the guiding and retaining members 3 having the confronting channels 4 in which the longitudinal edge portions of the member 1 may slide when the member 1 is superimposed on the member 2 in flatwise sliding contact with the latter. The member 2 may carry a stop pin 5 which works in a longitudinal slot in the member 1, and is adapted to contact with the ends of the slot 6 to limit the relative longitudinal movements of the members 1 and 2 when the member 1 is superimposed on the member 2. The slot 6 preferably is formed to extend along the longitudinal median line of the strip 1, and the stop projection 5 of course extends from the corresponding portion of the member 2.

The guiding and retaining portions 3 of the member 2 terminate short of one end of the member 2, and that end portion of the member 2 is bent transversely upwardly and then rearwardly to produce a substantially U-shaped attaching member 7 which is an integral portion of the member 2 and is adapted to engage with a portion of a loop 8 or like fastening element, whereby the member 2 can be connected at one end with an elongated inelastic member 9 which may be a length of tape, ribbon, or the like, and which may be a portion of a garter, a suspender, a belt, or like article. The U-shaped attaching portion 7 is formed intermediate its side edges and at its end with a narrow prolongation which is bent outwardly and rearwardly to provide an integral hook 10 for engaging with an eye member or loop 11 at one end of a retractile coiled spring 12. The U-shaped attaching portion 7 and the hook 10 thus are curved reversely with respect to each other.

The strip 1 has a tongue struck therefrom intermediate the side edges of the strip 1 and adjacent to the end of the strip 1 which is remote from the hook 10 and this tongue is bent upwardly and then rearwardly to provide a hook 13 which curves reversely to the hook 10. Also, an opening 14 thus is produced in the strip 1 between the hook 13 and the adjacent end of the strip 1. The hook 13 is adapted to engage with a loop or eye 15 at the second end of the spring 12. The outer end portion of the strip 1 may be bent upwardly and then forwardly to produce a substantially U-shaped attaching member 16 which is bent reversely to the hook B and to the U-shaped attaching member 7 at the outer end of the strip 2.

This attaching member 16 may be engaged with a slot 17 in the base or pad portion 18 of a hose supporter fastener generally indicated at 19, and stitching 20 may pass through the slot 17 and the opening 14 to bend the lapped portions of the pad 18 of the hose supporter fastener and strip 1 together.

It is manifest that the opposite ends of the strips 1 and 2 may be formed to produce attaching members of shapes different from those shown in the drawings, and adapted for connection with cooperating fastening elements of various known types for connecting the opposite ends of the members 1 and 2 of the device with adjacent members of any article in which the device is to be incorporated. The device is particularly well adapted for use to connect adjacent sections of a suspender, a belt of a vest or other garment, a garter, or in fact any article in which a limited amount of elasticity is desirable. The spring 12 will function to yieldingly resist relative longitudinal movement of the members 1 and 2 from the positions shown in Figures 1 and 2 in the directions required to increase the effective length of the device, and when the members 1 and 2 are extended with respect to each other, the spring 12 will tend to return the members 1 and 2 to retracted positions as shown in Figures 1 and 2.

Obviously, the invention is susceptible of embodiment in forms other than that which is illustrated in the accompanying drawings, and I therefore consider as my own all such modifications and adaptations thereof as fairly fall within the scope of the appended claims.

I claim:—

1. A yielding unit comprising a pair of strips of inelastic material capable of limited relative longitudinal movements in sliding contact with each other, the opposite end portions of said strips being bent laterally and then toward each other to provide a pair of reversely curved substantially U-shaped attaching portions at opposite ends of said strips, one of said strips having a prolongation at the end of said U-shaped attaching portion bent reversely to the curvature of the U-shaped attaching portion to produce a hook, the other of said strips having a tongue struck therefrom adjacent to its outer end to produce an opening in the last named strip, said tongue being bent to produce a hook which is curved reversely to said hook at the outer end of the first strip, and a retractile spring having end portions adapted to engage said two last named hooks to connect said strips.

2. A yielding unit comprising a pair of strips, one of said strips being formed for part of its length with the longitudinal edge portions thereof bent to produce guiding and retaining members for engaging with the longitudinal edge portions of the other strip when the latter is superimposed on the first strip, one of said strips having a longitudinal slot and the other strip having a stop projection working in said slot, said strips having integral oppositely disposed hook portions adjacent to the outer ends of the strips, and a retractile spring engaged at its ends with said hook portions.

3. A yielding unit comprising a pair of strips, one of said strips being formed for part of its length with the longitudinal edge portions thereof bent to produce guiding and retaining members for engaging with the longitudinal edge portions of the other strip when the latter is superimposed on the first strip, one of said strips having a longitudinal slot and the other strip having a stop projection working in said slot, said strips having integral oppositely disposed hook portions adjacent to the outer ends of the strips, and a retractile spring engaged at its ends with hook portions, said strips having the opposite end portions thereof formed for connection with adjacent members which are to be connected by said unit.

DANIEL BRADFORD JACOBS.